Oct. 25, 1966  A. STRICKLER  3,280,478
OPTICAL DEMONSTRATION METHOD AND APPARATUS
Filed April 2, 1963  6 Sheets-Sheet 1

INVENTOR.
Allen Strickler

Oct. 25, 1966  A. STRICKLER  3,280,478
OPTICAL DEMONSTRATION METHOD AND APPARATUS
Filed April 2, 1963  6 Sheets-Sheet 2
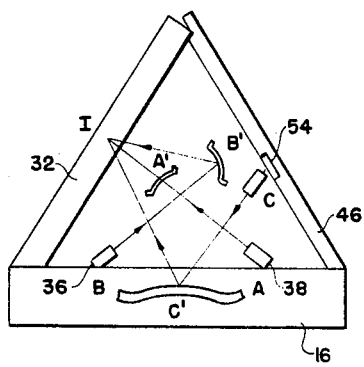
FIG. 3
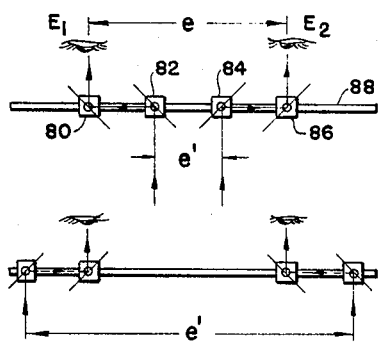
FIG. 5a
FIG. 5b
FIG. 5c
INVENTOR.
Allen Strickler Oct. 25, 1966   A. STRICKLER   3,280,478
OPTICAL DEMONSTRATION METHOD AND APPARATUS
Filed April 2, 1963   6 Sheets-Sheet 3

INVENTOR.
Allen Strickler

Oct. 25, 1966  A. STRICKLER  3,280,478
OPTICAL DEMONSTRATION METHOD AND APPARATUS
Filed April 2, 1963  6 Sheets-Sheet 4

INVENTOR.
Allen Strickler

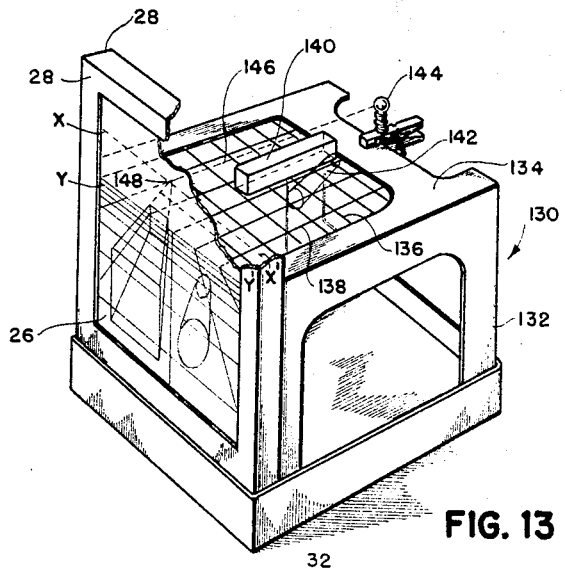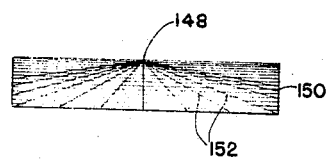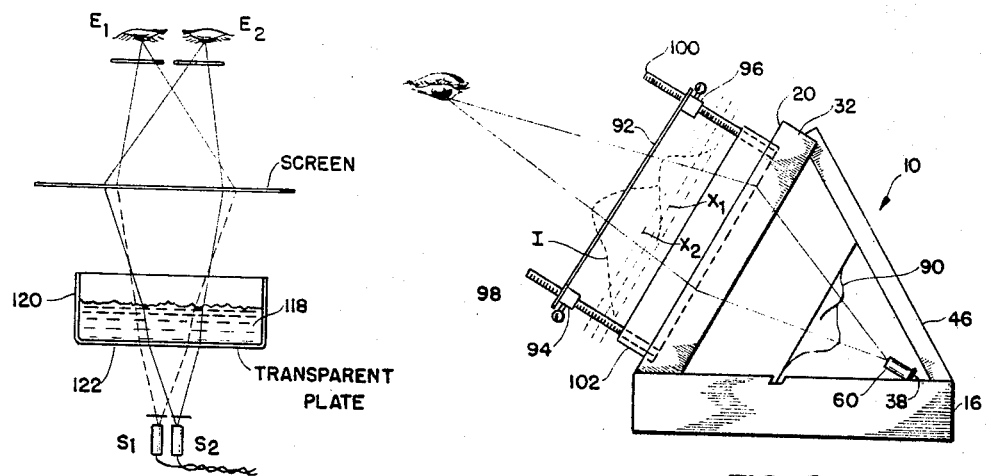

INVENTOR.
Allen Strickler

United States Patent Office 3,280,478
Patented Oct. 25, 1966

3,280,478
OPTICAL DEMONSTRATION METHOD
AND APPARATUS
Allen Strickler, 1324 E. Glenwood Ave., Fullerton, Calif.
Filed Apr. 2, 1963, Ser. No. 270,101
15 Claims. (Cl. 35—19)

This invention relates to a method and apparatus for demonstrating optical and visual perception phenomena and more particularly relates to a method and apparatus useful for demonstrating the phenomena of geometric projection, perspective and stereoscopic vision.

It has become increasingly apparent in recent years that the provision of apparatus for demonstrating various phenomena greatly aids and simplifies the teaching of the scientific principles. One of the most interesting fields of science, and one of the most difficult in which to convey an understanding of principles without visual demonstrations, is that of optics and optical perception. It is therefore an object of the present invention to provide apparatus for aiding an instructor in the presentation of various principles of optics and optical perception, and which will be enlightening and entertaining for his students. It is also an object of the present invention to provide a method of demonstration and experimentation in the physical and psychological principles of optics.

It is another object of the present invention to provide apparatus self-sufficient in demonstrating various optical principles and which can be used by an individual student without the necessity of an instructor being present.

It is also an object of the present invention to provide apparatus for experimenting with and demonstrating the principles of geometric projection, perspective and stereoscopic vision.

It is a further object of the present invention to provide apparatus utilizing various optical principles for producing images useful for instructional purposes, advertising, and the like.

These and other objects and advantages of the present invention will become more apparent upon reference to the accompanying description and drawings, in which:

FIGURE 3 is an elevation view illustrating several ways of positioning the various elements of the apparatus of FIGURE 1;

FIGURE 5a is an elevation view of an accessory which may be used with the apparatus of FIGURE 1; FIGURE 5b is a top plan view thereof; and FIGURE 5c is a top plan view of a modification thereof;

FIGURE 9 is a side elevation of another embodiment of the present invention;

FIGURE 11 is a representative view of still another use of the principles of the present invention;

FIGURE 13 is a perspective view of another embodiment of the present invention;

FIGURE 14 is a front elevation of an element for use with the apparatus of FIGURE 13;

Figure 1:
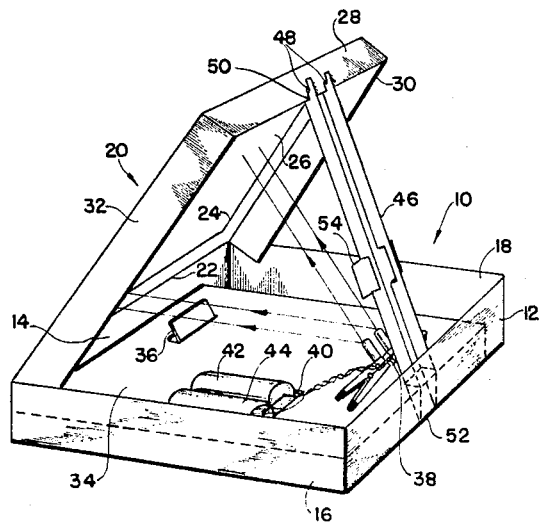
FIGURE 1 is a perspective view of the basic apparatus of the present invention.

Referring now to FIGURE 1, there is shown the basic apparatus used to perform the various demonstrations and experiments of the present invention. A rectangular or square box, generally indicated at 10, is defined by two end portions 12 and 14 and two lateral portions 16 and 18. The box is preferably made of heavy cardboard, the sides 12, 14, 16 and 18 being cut and folded up from a single sheet of cardboard and joined together in the conventional manner. The box 10 is provided with a top portion 20, preferably formed of the same piece of cardboard and hinged to the end portion 14 along a line 22. A large rectangular area 24 of the top portion 20 is removed and the resultant opening is covered with a sheet of translucent material 26 which serves as a screen for a number of the demonstrations. The top portion 20 is provided with dependent sides 28, 30 and 32 which are formed by cutting and folding suitable portions of the top 20.

A false bottom 34 is inserted into the box 10 and supported above its base portion in any convenient manner, for example, by cutting and folding a piece of heavy cardboard in the same manner as was used to fashion the box itself. The dimensions of the false bottom are preferably smaller than the interior dimensions of the box so that a space is provided for receiving the dependent sides 28, 30 and 32 when the top 20 is folded down toward the box. The false bottom 34 is provided with a pair of upstanding tabs 36 and 38 which serve to support light sources for purposes to be explained presently. These tabs are conveniently formed by making a suitable three sided cut in an underfolded portion of the false bottom 34 and bending the resultant cut out upward through a slot. The false bottom 34 is also provided with a cut out portion 40 in which can be positioned a suitable electrical power source, for example, a pair of flashlight batteries 42 and 44.

In order to support the top 20 a satisfactory distance from the box 10 and at a satisfactory angle thereto, a brace 46 is provided. The brace 46 is preferably U-shaped and provided at its upper end with a pair of slots 48 which cooperate with a similar pair of slots 50 in the end portion 28 of the top 20. The upstanding portions of the lower end of the U-shaped brace 46 are cut in a triangular pattern so as to cooperate with a rectangular slot 52 cut in the false bottom 34. Approximately one-third of the distance from the lower end of the brace, a tab 54 is provided, such as by cutting out a suitable portion of one or both of the upstanding portions of the brace before it is bent into its U-shape. It should be understood that although all of the apparatus thus far described is most easily and conveniently constructed of heavy cardboard, any other suitable material, such as a light plastic, could be used.

Figure 2:
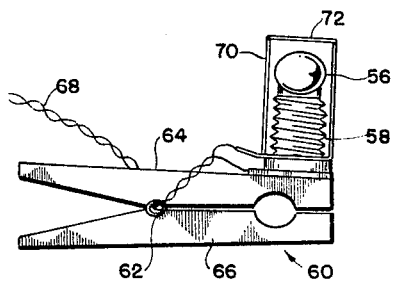
FIGURE 2 is an elevation view, partly in section, of a lightbulb mounting device used in the apparatus of FIGURE 1.

FIGURE 2 illustrates a convenient device for attaching a suitable light source to the various tabs of the previously described structure. Such a light source is usually a confined or point source of light and may take the form of a flashlight bulb screwed in a conventional socket 58. The socket 58 is fastened by cementing or other suitable means to a clip 60, similar to the common clothes pin, and having a spring 62 biasing together the ends of its two leg portions 64 and 66. A pair of wires 68 that can be connected to the batteries 42 and 44 are connected to the two terminals of the socket 58. A switch (not shown) is preferably provided to open the lighting circuit and thus conserve the batteries when the apparatus is not in use. A cylindrical member 70, preferably opaque, envelopes the socket 58 and bulb 56 and serves to support a filter 72 which is preferably a colored sheet of thin plastic. As can be seen from FIGURE 1, the source and filter assembly is easily attached to one of the tabs by attaching the spring biased ends of the clip 60 thereto. For most of the demonstrations two light sources having different colored filters, for example, red and green, are needed. These may be provided by using two of the devices shown in FIGURE 2, or alternately, a single source may be combined with two mirrors in a corner-mirror arrangement and with two filters to achieve the same result.

FIGURE 3 illustrates the three primary postions in which the point source or point sources may be positioned for various demonstrations or experiments. As shown, the sources as mounted in the clips shown in FIGURE 2, may be fastened to any of the tabs 38, 36 or 54, these positions being designated A, B and C, respectively. The approximate locations in which an object whose image is to be formed is positioned, corresponding to the positions A, B and C of the sources, are shown at A', B' and C' respectively. In position A, the light is projected by direct transmission through the object to cast an image I on the screen. At positions B and C, the light is reflected by the object on to the screen.

Among the phenomena that may be demonstrated by this apparatus are those of space perception. The perception of spacial relationships and forms is governed by a variety of factors, probably the most important being the visual clues derived from the fact that the observed visual field is a geometric projection of real space. Considering the vision of a single eye, this projection is essentially that formed by considering the eye as an origin, drawing straight lines from it through all points of the object and intercepting these lines by a distant plane normal to the visual axis. In stereoscopic vision, because of the lateral separation of the two eyes, the same object or scene produces a pair of slightly different projections. These two images are fused in the brain to give a single stereoscopic experience. The clue to the spacing of object points in depth apparently is given by differences in convergence of the pair of rays drawn from the two eyes to these object points at various distances.

Whether teaching perspective (the view seen by a single eye), or stereoscopic vision, the invention uses point sources of light to simulate the eye or eyes. Straight light rays from the source or sources traverse a three-dimensional object, then fall on a screen where they form the projection. Each image is geometrically similar to that which would form on the retina of an observer's eye, assuming the eye to be at the position of the source, and viewing the same object as "viewed" by the source. A perpendicular line drawn from the light source to the screen is analogous to the viewing axis or the optic axis of the eye extended forward into space. The properties of the projection formed on the screen may be studied in various ways. The position of the source (the "eye") with respect to the object may be shifted, and the effect on the projection observed. A sheet of paper may be laid on the screen, the projection or a portion thereof copied, and the changes observed as either the light is changed in position, or the object changed in either position or attitude. Objects of varying form may be studied.

For studying stereoscopic perception, two laterally spaced point sources are used to simulate the two eyes of the observer. Two projections are thereby formed simultaneously, ordinarily overlapping at least in part on the same screen. If now we provide means whereby one of the eyes of the experimenter sees selectively only one of these images, while the other eye sees only the other of the images, we have in effect synthesized a stereoscopic experience. A three-dimensional view is then presented to the consciousness of the observer analogous to the view "seen" by the pair of sources of the object between the sources and the screen. Such a sensation can be created by differentially modifying the rays issuing from each source. For example, a green filter may be placed over one source, and a red filter over the other in the manner shown in FIG. 2. Preferably, there would be negligible overlapping of the spectral transmission characteristics of the filters in the visible region. The distribution of the rays is modified by the object, for example the distribution of intensity by the presence of opaque or partially transparent lines or zones. The rays of altered distribution are intercepted by a screen, to form a pair of images thereon, which may be partially overlapping. The screen may be opaque, and viewed from the side on which the sources are located, or translucent and viewed from the opposite side. To reconstitute a stereoscopic image in the mind of the viewer, the following is now necessary: the projection formed by the source simulating the right eye must be made visible only to the right eye of the viewer, and that by the other source visible to the left eye only. Thus, for projection on an opaque screen, a filter is placed in front of the viewer's right eye that is similar to the filter on the right-hand source, and a filter on the left eye similar to that on the left source. An extraordinary three-dimensional "shadow" appears suspended in space between the observer and the screen. If the screen is translucent, and viewed from the other side, each of the projected images is now a mirror-image of that on the projection side. As a result, an abnormal "everted" three-dimensional view of the object is seen. The image appears to lie behind the screen, and its more distant parts appear larger, rather than smaller, than those closer at hand. This results from the fact that corresponding points in the two images which represent a relatively close object point subtend a smaller angle to the eyes than those representing a more remote point. The reverse is required for the normal image. This may be corrected by switching either the filters on the sources or those in front of the eyes.

Figure 4:
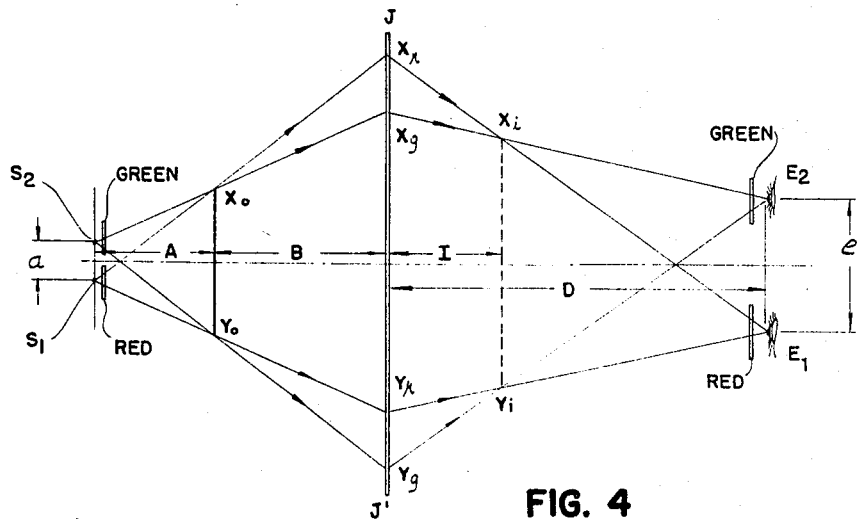
FIGURE 4 is an optical ray diagram showing one manner in which an image can be formed by the apparatus of FIGURE 1.

FIGURE 4 shows the geometric relationships which determine the location and size of a three-dimensional image perceived in space when the object is positioned between a pair of sources $S_1$ and $S_2$ and a screen, that is, with the sources placed at position A in FIGURE 3, and the object at A'. FIGURE 4 is essentially a plan view with both eyes $E_1$ and $E_2$ of the observer lying in the plane of the drawing. The line of sight is normal to, or nearly normal to the screen plane J, J' which is approximately normal to the drawing plane. The two point sources $S_1$, $S_2$ lie in a plane parallel to the drawing plane.

Let us assume as a simple object an opaque line in space, defined as a straight line joining points $x_0$ and $y_0$. For simplicity the line is shown parallel to the screen, and may be assumed parallel to the drawing plane. The green-filtered source $S_2$ forms a shadow of $x_0$ at $x_g$; the red-filtered source a shadow of $x_0$ at $x_r$. The sources correspondingly produce shadow points $y_g$ and $y_r$ of object point $y_0$. The green-filtered eye sees only shadow points $x_g$ and $y_g$; the red-filtered eye only shadow points $x_r$ and $y_r$. The lines of view toward these shadow points form intersections at points $x_i$ and $y_i$ in space, and what the viewer sees is a line in space joining points $x_i$ and $y_i$, corresponding to the object line $x_0$, $y_0$.

The apparent distance I of the image line $x_i$, $y_i$ from the screen is given by the relationship $$I = \frac{BaD}{Ae + Ba} \tag{1}$$

the symbols representing the distances shown in FIG. 4.

For purposes of study, the apparatus permits varying and measuring the distances A and B, the total distance $A+B$ of the sources from the screen, the source separation $a$, or the distance D of the eyes from the screen, and verifying the predicted effect on the apparent image distance I, which likewise is measurable by a rule interposed between the screen and the eye. A limiting case of interest is that in which B, $a$ or D become zero, at which time the image appears to lie in the plane of the screen. The apparent distance C of the image point from the eyes may then be shown to be $$C = \left(\frac{D}{A+B}\right) A \qquad (2)$$

Since $A+B$ is constant, this states that for any given viewing distance D from the screen the distance of any image point from the eyes is proportional to the distance of the corresponding object point from the sources. That is, the image is "true" to the object in the depth dimension. When $a$ is not equal to $e$, the depth scale is slightly distorted. At $a<e$, the depth scale is somewhat elongated for image points closer to the eye than to the screen, and relatively compressed for image points farther from the eye than from the screen. For $a>e$ the reverse is true.

Complete trueness of the image requires, however, not only that its depth scale be proportional to that of the object, but that its apparent transverse dimensions be also in proportion. Further, the proportionality factor must be the same in both cases—otherwise the entire image will be flattened or elongated in the depth dimension.

It may be shown that complete image fidelity occurs only under the simultaneous conditions of $A+B=D$ and $a=e$. If we designate as L any transverse dimension in the object (that is, any dimension lying in a plane parallel to the screen) the apparent corresponding dimension in the image is given by $$H = Le\left(\frac{A+B}{Ae+Ba}\right) \qquad (3)$$

H is therefore proportional to L at given values of $e$ and $a$, but the proportionality factor varies with A and B, i.e. with the distance of the object plane from source and screen. It is convenient to define the ratio of transverse image dimensions to apparent transverse object dimensions, $H/L$, as a function of two quantities: (1) the ratio R, of A to B, i.e. the fractional distance of object from source to screen, and (2) the ratio $f$ of $a$ to $e$, or ratio of inter-source to interocular distance. We have then $$\frac{H}{L} = \frac{1}{R(1-f)+f} \qquad (4)$$

The ratio $H/L$ is seen to be independent of eye to screen distance D. At $f=1$, or inter-source equal to interocular distance, $H/L=1$, i.e. object and image transverse dimensions are equal, independent of R as well as D. Since also as shown earlier, the apparent image dimensions in depth are proportional to object depth only at $f=1$, and the depth proportionality factor is unity only at $A+B=D$, it follows that overall image-object fidelity occurs only when both $A+B=D$ and $a=e$.

When the inter-source distance is less than the interocular ($f<1$), it may be shown from Equation 4 given above that $H/L>1$, i.e. the apparent transverse image dimensions are greater than the corresponding object dimensions and the ratio varies with R as indicated by the equation. Conversely, for $f>1$, $H/L<1$. The extent of variation of the ratio $H/L$, at reasonable fixed, but different values of $e$ and $a$, when different image depth planes are considered, is moderate. Thus, for a typical table-top apparatus, where $f$ is about ⅓, and R may vary from about ⅓ to ⅔, the corresponding range of $H/L$ is from 1.80 to 1.28. This degree of lateral distortion at different depth planes is not found to be objectionable.

With the desk-type of apparatus shown in FIGS. 1 and 3, it is not convenient, without optical modification, to obtain perfect image-object fidelity. If the inter-source distance is made equal to the interocular distance, the two projections on the screen are considerably separated, and the angular accommodation required of the eyes is excessive. For the usual source separation, which is less than the eye separation and ordinarily about ¾ inch, and for the usual size of object in the mid-range between sources and screen, the distortion is unobjectionable, as mentioned before. But the important advantage of having $a$ less than $e$, for close viewing in a desk-top apparatus, is that now the entire image lies literally within reach of the observer. Normally the screen is about 1½ times the usual reading distance from the eye. The image itself lies at about the usual reading range. This image lying in front of the screen can be "probed" with a pointer in the observer's hands, measured in depth or transversely with a rule (preferably of transparent plastic type) held "in" the image in front of the screen, or intersected by a real transparent plane, for example a transparent plastic sheet, held in front of the screen, and marked with an orthogonal grid for exploring the image properties.

If desired, a simple optical aid makes possible the viewing of an image with full optical fidelity at normal close range. This aid is of the nature of a double periscope to be held in front of the eyes, and is shown in FIGURES 5a, 5b and 5c. FIGURE 5a is an elevation view, FIGURE 5b a plan view and FIGURE 5c a plan view of a modified form of the aid. Mirror elements 80, 82, 84 and 86 are mounted for sliding lateral movement on a bar 88. If the distance $e'$ is made equal to $a$, the inter-source separation in FIGURE 4 and the eyes are at a distance in front of the screen equal to that of the sources behind, then the image is faithful. This optical aid serves as a means for effectively varying the interocular distance at will. FIGURE 5c show show the mirror elements may be reversed on the bar to study the result of a greater than normal effective interocular distance $e'$.

An alternative arrangement for faithful imaging is the following: The sources are separated by an amount equal to the normal interocular distance (i.e. 3 to 4 times the usual value); the screen is likewise enlarged 3 to 4 times in width and height, and both the source and viewing distances are increased by the same factor to make $$A+B=D$$

(i.e. source-to-screen equal to screen-to-eye). This enables a group of persons, each fitted with a pair of filter-spectacles, to view the enlarged screen conveniently at the same time. Further amplification of screen size, inter-source distance and viewing distance permits viewing by a still larger audience, but the image begins again to be distorted in depth. This effect need not, however, be objectionably large.

Figure 6:
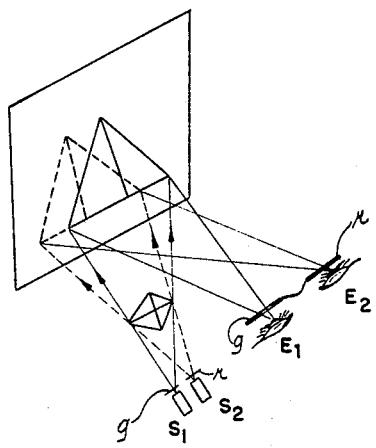
FIGURE 6 is a perspective view of the elements of FIGURE 1 employed in a modified arrangement.
Figure 7:
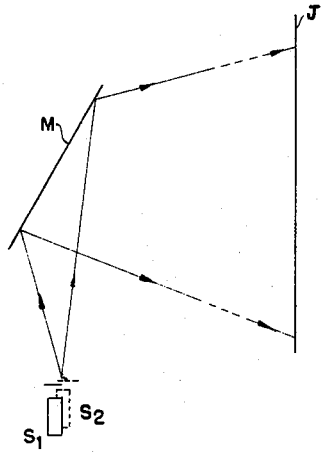
FIGURE 7 is a representative view of the present invention used with an overhead projector arrangement.

When an opaque screen is used in the arrangement for example shown in perspective in FIG. 6, with green and red filters ($g$ and $r$ respectively) placed as shown (so that the right eye sees only the image projected by the right-side lamp and the left eye only that of the left lamp), the geometry of image formation is the same as that shown in FIG. 4. The projection on the screen is unchanged, and is merely viewed from the same side as the source rather than the opposite side. The Formulae 1 and 3 given for apparent image location and transverse dimensions are the same, and the definitions of the symbols are as before. Opaque projection lends itself to the use of conventional viewing screens, therefore is suitable for demonstrating the phenomena of the invention to relatively large audiences. An overhead projector arrangement can be used as shown in FIGURE 7 with the projection object interposed between the sources $S_1$, $S_2$ and the 45° mirror M, or between the mirror and the screen J. If the object is of reflective type, for example a deformable reflective surface as described later, this object may replace the 45° mirror of the overhead projector.

Figure 8:
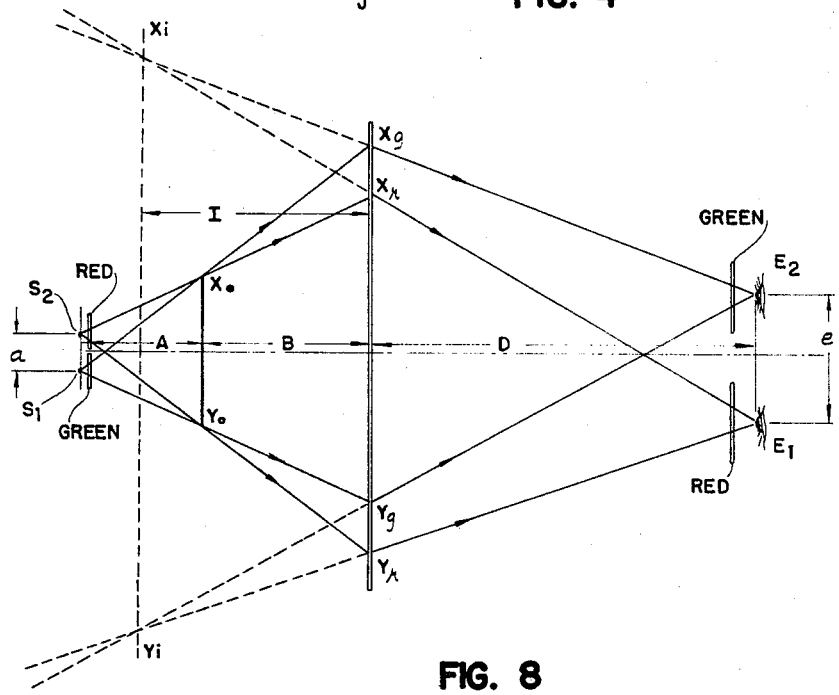
FIGURE 8 is an optical ray diagram showing another manner in which an image can be formed by the apparatus of FIGURE 1.

FIG. 8 shows the geometry of image formation when the filters on either the source or the eyes are interchanged, giving an apparent "everted" perspective in the stereoscopic image. The image now appears to lie entirely behind the screen, and the apparent distance I of any image point behind the screen, corresponding to an object point a distance B from the screen, is given by $$I = \frac{BaD}{Ae - Ba} \quad (5)$$

The fact that I increases as A decreases accounts for the "inside-out" perspective. A limiting case of interest is that in which the denominator of the equation above becomes zero, i.e. $Ae=Ba$. The apparent distance I of the image behind the screen then appears infinite, and the view lines $E_1$, $X_r$ and $E_2$, $X_g$ (as well as $E_1$, $Y_r$ and $E_2$, $Y_g$) become parallel to each other.

The apparent transverse dimensions in any plane of the image taken parallel to the screen, corresponding to a parallel object plane a distance B behind the screen, is given by $$H = L\left(\frac{Ae + Be}{Ae - Ba}\right) \quad (6)$$

We note that H is independent of eye-to-screen distance D, and further, that at $a=e$ $$H = L\left(\frac{A + B}{A - B}\right) \quad (7)$$

Although the invention has been described as using red and green filters mounted in front of the light sources and corresponding filters before the observer's eyes for modifying and viewing the various images, other means for selectively modifying and viewing the light from the two sources are equally useful. Further, they have the incidental advantage that the images may be in full natural color. For example, polarizing filters of conventional construction may be used. One such polarizing filler is placed in front of each source, but the two filters are differently oriented so as to give polarized beams with electric vectors 90° apart. Polarizing spectacles, with filters likewise oriented 90° apart, are worn by the viewer. For seeing the normal image, perspective, the filter on the right eye is oriented to pass light from the right-hand source; that on the left eye from the left-hand source. Preferably an opaque screen is used, of metallic surface type, from which the reflected light is not excessively depolarized.

A light chopper arrangement could also be used for this purpose. A chopper disk or oscillating mask is positioned in front of the sources, and sectored so as to allow passage of light alternately from the two sources to the screen at a frequency of about 25 cycles per second or higher. A synchronous motor may be used to drive the chopper. The viewer is a small box with viewing apertures held against the eyes of the operator. It contains a similar small rotating or oscillating chopper allowing alternating passage of light from the screen to the two eyes at the same synchronized frequency. It too is synchronous-motor driven and the phasing is such (for normal perspective imaging) that the right eye sees only light originating from the right source, and the left eye only light from the left source.

In the foregoing discussions both of single-source (simple perspective) and dual-source (stereoscopic) projections, we have confined ourselves to objects causing no appreciable transverse deviation of rays passing through them. The object is either opaque, transparent but with opaque defining edges, transparent but surface-marked with lines or other matter, or transparent and marked by colored areas. Interesting and instructive object forms which may be used are: regular hollow solids, e.g. cubes or cylinders; cones, etc. made for example from a thin plastic sheet; woven screening, or open-mesh fabric or lace; patterned glass tumblers, etc. If the object is a transparent plastic sheet with a hole in it, and the dual source arrangement is used for stereo-imaging, the osberver can pass a pencil or the like through the hole in the image. Uncannily, the pencil is not stopped at the edges of the hole, but passes freely on through the ghostly image without resistance. Referring to FIG. 3, the normal arrangement for viewing any objects of the aforementioned group would place the source (or two laterally adjoining sources) at A, and the object in the position A'.

The apparatus and principles of the present invention may also be used for various other demonstrations and experiments. One such experiment may be designated as stereo-mapping and is analogous to methods now commonly used for the aerial contour mapping of terrain. In this method, the camera in the aircraft in effect obtains two views of any given portion of terrain from two slightly different angles. In the laboratory these are projected simultaneously through filters onto a viewing table. The operator sees a three-dimensional terrain image and plots the lines representing various contour levels. This process can be simulated in a novel and instructive manner by use of the apparatus of the present invention.

Referring to FIG. 9, the plane in which are located the eyes of the observer and the point sources is perpendicular to the plane of the drawing. The sources are about ¾ inch apart, fitted with filters as heretofore described. The "object" 90 is a sheet of transparent plastic heat-formed into the shape of a terrain, e.g. representing hills and valleys, and on the surface of which may be printed (for example as a transparency) a pattern of trees, houses, roads, etc. The terrain form is suitably supported with its "high" points closer to the source and its base plane parallel to the screen.

The observer, wearing suitable filter spectacles, sees a three dimensional image I of the terrain in front of the screen, usually enlarged, and with the "high" points closest to him. The observer now mounts a transparent plane 92 at a series of positions in front of the screen to intersect the image in a succession of planes parallel to but at incremental distances from the screen. The intersecting planar sheet may be of clear plastic. It may be printed with a grid of lines, or lightly embossed or otherwise textured to make it easily visible. The plane is adjustably supported, for example against four adjustable clamps (only two of which 94, 96 are shown) mounted on a plurality of corresponding calibrated rods 98, 100, these being mounted on a frame 102 which is suitably fastened to the top 20 of the box 10. In each of the successive plane positions $X_1$, $X_2$, etc., the observer draws with a wax-type pencil a contour line on the plane 92 by tracing the line of apparent intersection of the terrain image and the plane. A complete contour map may be constructed in this way. If the "depth" of the terrain model is not too large relative to the source-to-screen distance D, a linear calibration may be applied to the support rods (e.g. marked in feet). The resulting inaccuracy in indicated contour spacing is relatively small. For greater accuracy, the calibration may be appropriately non-linear. An accurate contour drawing requires a fixed and predetermined position of the eyes with respect to the screen. If desired, this can be facilitated with a sighting device, not shown.

Another category of images formed by the invention is that in which the object transversely deviates the rays impinging on it. Using two adjacent sources as before, the three dimensional images thus produced may be so completely transformed that the object is no longer recognizable. As three dimensional entities, the images are then purely constructions in the mind of the observer, without physical counterpart in nature. The shape perceived is merely the particular hypothetical three dimensional form which alone is consistent with the two projections, often bizarre and fantastic, formed by the object on the screen. These "stereo-artifacts" not only make fascinating entertainment in their endless variety and imaginative appeal, but interest the psychologist as a unique perceptual experience.

First let us consider the artifacts formed when the rays are transversely deviated as a result of refraction by the object. Referring to FIG. 3, assume for the moment that a single source is positioned at A, and that the object is at A'. The object is at least in portions thereof a transparent and refractive medium, and in virtue of the shape and orientation of the refractive interfaces transversely deviates impinging light rays.

Figure 10:
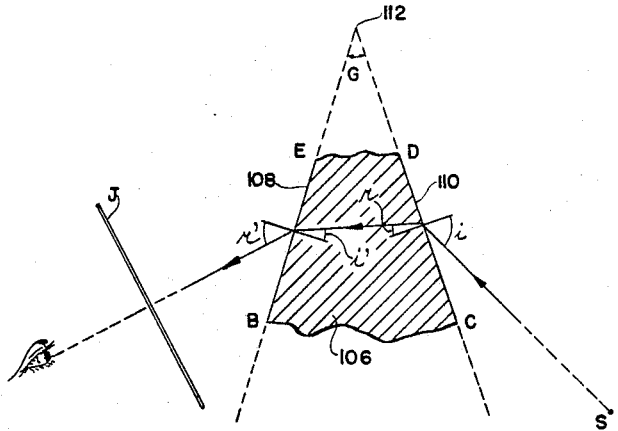
FIGURE 10 is a representative view of another use of the principles of the present invention.

Referring to FIG. 10, zone 106 represents a small element of such an object. Assume that it is bounded by outer faces 108 and 110 which, in this small region, may be considered flat. These faces are in general non-parallel and if extended intersect at a line which is represented by the point 112. In general, the effect of transverse displacement of the beam (proportional to thickness of the prismatic element) will be small compared with that of angular deviation caused by the prism. We therefore consider here only the latter effect. We shall limit ourselves also to ray components lying in planes perpendicular to the prism apex line, i.e. in the direction of most significant deviation.

If $i$ and $r$ are the angles respectively of incidence and refraction at face 110, $i'$ and $r'$ the corresponding angles at face 108, G the prism angle and $n$ the refractive index of the medium, the following relationships hold:

$$\sin r = 1/n \sin i \qquad (8)$$
$$i' = G - r \qquad (9)$$
$$\sin r' = n \sin i' \qquad (10)$$

The total angular deflection $\delta$ of the impinging ray incurred in the two refractions is $$\delta = i + r' - G \qquad (11)$$

In the case where G and the incident angle $i$ are small, it may be shown that $$\delta = (n-1)G \qquad (12)$$

This gives for the transverse deviation $d_s$ at the screen J $$d_s = \delta B \qquad (13)$$

where as before B is the object-to-screen distance.

Take now the actual case in which two sources are used. Usually the angle subtended from the two sources to the refractive element is relatively small. Assuming again that the prism angle G and the incident angle $i$ are small, it follows that for a given refractive element that total linear deviation $d_s$ at the screen for a ray originating in either source is about the same. The result is that refractive deviation at any object point causes only a transverse displacement in the corresponding image point, with no apparent displacement in depth.

The magnitude of apparent transverse deviation $d_i$ in the image is given by $$d_i = \delta B \left( \frac{Ae + Ba}{Ae + 2Ba} \right) \qquad (14)$$

where A, B, $a$ and $e$ are as earlier defined (Equation 1), and the filters at the sources and in front of the eyes are in the "normal" perspective arrangement.

In the general case, prism angle G and angle of incidence $i$ may be large. Assuming the prism is oriented to give appreciable lateral deviation in a "horizontal" plane, i.e. with a deviation component in a plane parallel to that defined by the eye positions and the viewing axis, then some dislocation of the image point in depth may occur. If for example the effective prism apex line is normal to such a parallel plane, the effect on depth of the image point is the same as that of changing the separation $a$ of the sources by a certain fraction $f$. Thus, the quantity $a$ changes to $a + fa$, where $f$ is given by $$f = 1 - \left( \frac{\cos r' \cos r}{\cos i' \cos i} \right) \qquad (15)$$

The fraction $f$ is negative when the angle of incidence $i$ on the prism element is less than that for minimum deviation, and positive when the angle of incidence is greater. Reference to the equations given earlier for effect of source separation will show that at $f < 1$, the image point will appear farther from the observer, and closer when $f > 1$. The equation for $f$ above assumes that the sources subtend a relatively small angle to the object, this being generally true in practice.

Examples of interesting refractive objects are: glass tumblers with thick bottoms, vinyl, methacrylate or other plastic objects bent, cut or formed to various shapes, gel-like forms e.g. of gelatin, liquid-wetted surfaces, and free liquid surfaces. An arrangement for the last mentioned case is shown by way of example in FIG. 11, where a body of liquid 118 in a container 120 with a transparent bottom plate 122 is positioned between the sources $S_1$, $S_2$ and the screen.

Figure 12:
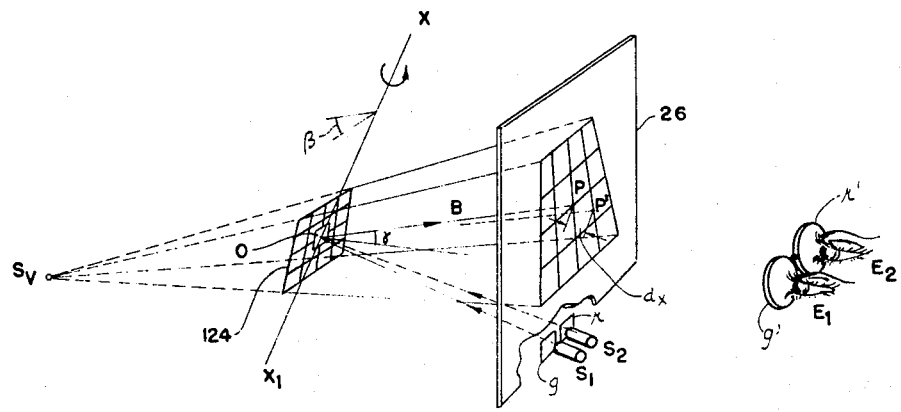
FIGURE 12 is a perspective view of another use of the principles and apparatus of the present invention.

Let us now consider artifacts formed by reflection. Referring again to FIG. 3, assume a source at B, and a deformable, plane reflector, e.g. a flat sheet of bright metal foil 124 at B'. To better see the disposition on the screen of rays reflected from various portions of the sheet, a grid of lines may be drawn on the reflector. The arrangement is shown in perspective view in FIG. 12. A representative reflective path is $S_1OP$, the ray being reflected at point 0 at an angle $\gamma$ with respect to the normal at the surface. The image on the screen is that which would be formed by an equivalent object plane of transmitting type, assuming a virtual source $S_v$ at the mirror-image position of $S_1$.

Consider now a slight arbitrary deformation of the reflector, for example by bending in the hands of the observer. In effect, various small elements of the surface are rotated through a small angle with respect to their former positions. The effect of translatory motion of the elements is small, and will be neglected here. Thus taking a small element 0 which will be considered flat, assume it is rotated through a small angle $\beta$ around an axis X–X' lying in the plane of the element. The reflected ray is displaced on the screen from P to P' by a distance $d_x$. The magnitude of $d_x$ is a function of rotation angle $\beta$, reflection angle $\gamma$, the distance B from the element to the screen, and the disposition of the screen with respect to the impinging ray direction and the rotation axis. When the reflected ray falls on the screen at an angle approaching the normal, the displacement $d_x$ for a small rotation angle approximates the value $$d_x = 2\beta B \cos \gamma \qquad (16)$$

As to the direction of the displacement $d_x$ on the screen, this is also dependent on the orientation of the rotation axis and the reflected ray with respect to the screen. In general, rotation of the axis of a given element sweeps the reflected ray around the axis to describe a cone. The line of intersection of the cone surface and the screen plane is the path taken on the screen by the displaced ray.

If now we add a second source $S_2$ (positioned such that a line joining $S_1$ and $S_2$ is parallel to the screen and to a line joining the two eye positions $E_1$ and $E_2$ of the viewer), a dual image of the reflector is formed on the screen. As before, different filters $g$ and $r$ are placed in front of the respective sources, and the viewer wears corresponding filters $g'$ and $r'$ over his respective eyes.

For "normal" perspective, the green filter $g$ passes light that will be transmitted also by the green filter $g'$ in front of the left eye; correspondingly, the red filter $r$ passes light that will be transmitted by the red filter $r'$ in front of the right eye. The image appears in front of the screen as a luminous, grid-marked sheet or carpet suspended in space. On bending or deforming the sheet in various ways, the three dimensional image billows, curls, snaps and sends up luminous minarets in an endless visual fantasy. For relatively small angles of rotation of any reflector element, the displacement of the corresponding element in the image will be in a transverse direction. There will be little or no displacement of its position in depth, i.e. in apparent distance from the viewer.

Referring again to FIG. 3, the sources may alternatively be placed at position C, and the reflector (in horizontal attitude) at position c'. In this arrangement, the reflector may be the mobile reflective surface of a liquid. Alternatively, the object at C' may combine a reflector and a refractive medium, e.g. a mirror covered with a layer of a transparent liquid, wherein refractive effects at the mobile liquid surface combine with the reflective effect.

The apparatus of the present invention is also useful in demonstrating the principles of perspective, which likewise involve projective geometry and space perception. FIG. 13 shows the apparatus modified for this purpose. The top portion 20 of the box 10 shown earlier in FIG. 1 is now in vertical position. A support 130 set into the bottom of the box has a pair of inverted U-shaped side supports (only one of which 132 is shown), and a horizontal connecting table 134. The support is preferably constructed of a single suitably cut and folded piece of heavy cardboard. The table 134 largely comprises a clear planar sheet 136, e.g. clear plastic, and is ruled with a grid of lines. Alternatively, the "table" may be simply an open grid of crossed, preferably interwoven strands, like those of a tennis racket. The table is preferably perpendicular to the screen, and the line grid is preferably one of orthogonal straight lines, one set of lines 138 being normal to the screen 26. Transparent objects 140 and 142 may be laid on the transparent table, or supported on, over, or even under it in any desired attitude. For demonstrating basic principles, these are preferably simple forms such as rectangular prisms, cylinders and cones. Moreover, they are preferably hollow and transparent, for example made of clear plastic. If desired, the defining edges of the forms may be emphasized by application of colored or opaque lines.

A "point" source 144 of light is mounted in a position to cast a shadow of the forms and ground plane on the screen. This source 144 may conveniently be one of the clips of FIG. 2 with the cylindrical member 70 removed. The rationale of these perspective demonstrations is as follows: The source may be likened to the viewer's eye in space, the objects and ground plane to a "landscape" or "object field" viewed by the eye, and the screen to a picture plane. On this picture plane is projected the perspective rendering or view, formed by drawing straight lines from the source (the "eye") through all points in the object field and extending these to intersect with the picture plane. In our apparatus these straight lines are drawn for us by light rays. The only difference between the view seen by an eye at the source position, and the view we see on the front of the screen, is that the latter is reversed (left-to-right reversal).

A perpendicular line 146 drawn from the source to the picture plane may be designated as the sighting axis. A common condition (though not a necessary one) in perspective views is that the horizontal or ground plane is normal to the picture plane. This is true of the arrangement in the figure. Obvious modifications can be made in the apparatus to alter the ground-to-picture plane angle.

In general, any set of parallel lines in the object field will, in the projection, converge toward a common "vanishing point." This point is the intersection with the picture plane of a line from the source drawn parallel to the object lines. Thus, in the figure, all lines in the object field which are parallel to the dotted line 146 form lines in the projection which converge toward point 148. A set of parallel object lines (for example those defining the sides of the cylinder 142) which are parallel to the ground plane but not parallel to the dotted line 146, will converge at some point along line X–X' other than point 148.

In a similar manner the effect of all other possible attitudes and positions of the objects may be studied and known principles of perspective demonstrated.

Since the grid-marked ground plane (being intercepted by the screen) cannot extend infinitely from the source, the projections of the grid lines parallel to dotted line 146 do not reach the horizon indicated as line X–X'. For demonstration, however, a "false horizon" drawn on a clear sheet 150, e.g. of plastic, as shown in FIG. 14, can be superimposed on the screen over the zone X X' Y' Y. The converging lines 152 on this strip are drawn as a continuation of the converging image lines seen on the screen and meeting at point 148 when the source is in a certain position, e.g. the central position as shown. For any other source position, this horizon strip is removed, although another suitably drawn strip may be substituted.

As an exercise, it is possible at any time to lay a sheet of translucent drawing paper on the screen, and to trace the image seen there. With a ruler, converging image lines may be extended to explore or confirm the points of convergence.

If now we proceed to move the source in various ways, instructive and striking additional effects are obtained. Thus moving the source horizontally (parallel to the screen) gives a motion picture effect like that of parallel hedgerows seen from the window of a moving train. If we move the source to a level below that of the ground plane, the ground plane on the screen assumes an above-eye-level aspect. If the source is slowly brought downward and toward the screen from a position higher than the ground plane, perhaps veering before it "lands," we see an "air view" perspective as from an airplane coming in for a landing. If we have an open, hollow object in the field (large enough to admit the source), and bring the source into it, it appears on the screen as if the viewer has himself entered into the object.

All the perspective views demonstrable with the single source can be seen in true depth by using a second source adjacent the first, with suitable filters over both sources, and suitable filter-spectacles over the viewer's eyes. The two sources may conveniently be clipped side by side on a dowel rod serving as a common support or "wand," and moved about together as desired.

According to the invention, the grid is preferably marked on the lower surface of the ground plane sheet. This attenuates any image of the grid that may otherwise be cast on the screen by reflection from the specular upper surface of the ground plane. By suitably polarizing the light from the source, as by placing a polarizing filter between it and the object field, we provide a supplementary or alternative solution to this problem.

With most diffusion-type screens, a confined source of illumination placed behind the screen produces a so-called "hot spot" (brightly lighted zone) on the screen, centered at the point where a line drawn from the source to the eye intersects the screen. With the usual viewing angle in our apparatus, this intersection may be near the top of the screen, or may pass over it entirely. Therefore illumination of the screen may be weak or non-uniform. This may be alleviated by tilting the apparatus upward at its front end. The ground plane will now slope downward slightly toward the back of the apparatus, but this is in no way objectionable. Alternatively, the screen may be fitted with a positive (converging) Fresnel lens. Preferably, this would be a decentered lens, with its optical center at or near the upper edge of the lens, to direct most of the light from the screen toward the eye.

Figure 15:
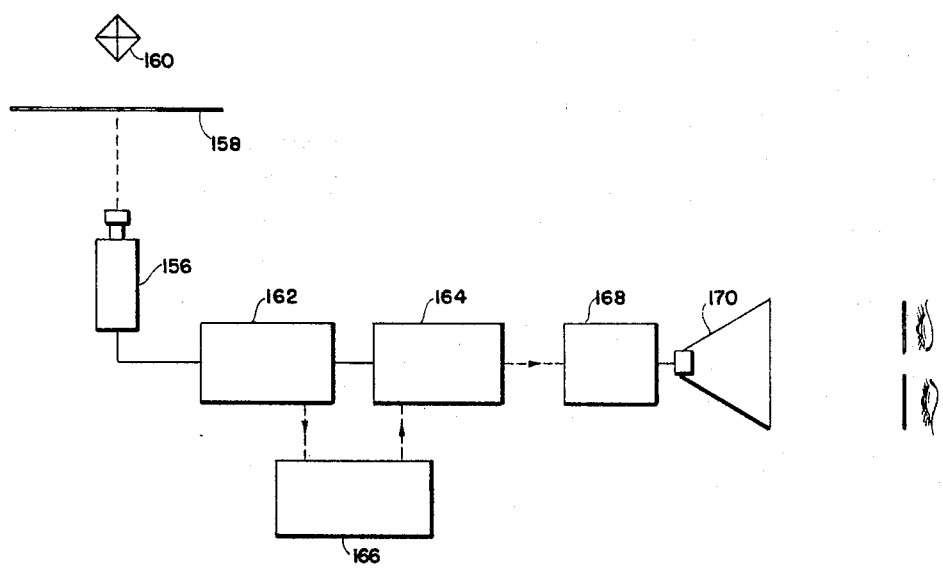
FIGURE 15 is a schematic block diagram showing the principles of the present invention applied to a color television system.

FIG. 15 illustrates, in block diagram form, an apparatus for incorporating the principles of the present invention in a color television system. A color television camera 156 is focused on a suitable translucent screen 158 behind which is positioned a pair of suitable sources $S_1$ and $S_2$ and an object of interest 160. The object may of course be of the transmitting or shadow-forming type or of the reflective type as heretofore described, and the object and sources may be suitably disposed, for example in one of the arrangements of FIG. 3. Also the screen may be of the opaque type, per FIG. 6. The sources $S_1$ and $S_2$ are covered by filters, as heretofore described, the wavelengths passed by each of the filters covering a range, as much as possible, that will result in excitation of only one color group of phosphor spots on a standard color television receiver tube. The output of the camera 156 is fed to a suitable signal former 162 and thence to a signal transmitter 164 and/or signal recorder 166, as is well known to those familiar with the art. The signals from the signal transmitter 164 are then transmitted through any suitable medium such as the atmosphere or via coaxial cable to a conventional receiver 168 which includes an imaging device 170, normally a standard color picture tube. As is well known, such tubes generally have coated thereon three groups of phosphor dots each of which generates one of three additive primary colors, e.g., red, blue and green. On the receiver tube screen, therefore, will be seen two images, generally overlapping at least in part, which reproduce the images formed by the sources $S_1$, $S_2$ and the object on the screen 158. One of these images would be formed substantially exclusively by the phosphor dots of one color type, and the other image substantially exclusively by dots of another color type. Thus, assuming the filter in front of source $S_1$ to be of a suitable red color, and the other a green, the corresponding receiver tube images would be defined respectively by the red-fluorescing and the green-fluorescing dots. The remaining blue dots would be substantially dormant and unused.

The observer is provided with spectacles equivalent to those heretofore described. One of the spectacle filters is designed to transmit substantially exclusively the light from one of the excited color dots, the other filters the light from the other excited color dot group. Thus the spectacle filters may be of suitable red and green transmitting types, respectively transparent to the red-dot and the green-dot radiations. All of the stereoscopic image phenomena described earlier, wherein the eye views directly on the screen the image formed by the two sources, may now be viewed via the television transmission system on the receiver image tube.

Such a system could lend a new dimension of dramatic effect to advertising and the like on color television. Slogans, etc., could be made to appear and move in space between the viewer and his set. The spectacles needed to observe the effects are inexpensive and could easily be distributed to viewers, for example in return for box tops, etc.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In an apparatus for forming a three dimensional image, the combination comprising:
    first and second laterally spaced sources of radiation, each providing a diverging beam emanating substantially from a point;
    means differentially modifying said beams while retaining their character of divergence from said points;
    a screen spaced from said sources and said differentially modifying means whereby a common space is formed along a radiation path between said sources and said screen;
    a three-dimensional object positioned in said common space, said object including a plurality of optical elements each intercepting and transversely deviating ray elements from both of said sources whereby said object modulates both of said beams and forms on said screen a pair of position-modulated images, each of said plurality of optical elements having an identifiable, corresponding position-modulated element in each of said images; and
    selective viewing means for cooperation with the eyes of an observer whereby different ones of said images are made visible substantially exclusively to different ones of the eyes of said observer thereby to form an apparent space-modulated, three-dimensional image of elements correlatable with but distorted with respect to said three-dimensional object.

2. The apparatus of claim 1 wherein said screen is translucent and wherein said selective viewing means is positioned on one side of said screen, and said sources, said radiation modifying means and said object are positioned on the other side of said screen.

3. The apparatus of claim 1 wherein said screen is opaque and wherein said selective viewing means, said sources, said radiation modifying means and said object are positioned on the same side of said screen.

4. The apparatus of claim 1 wherein said radiation modifying means and said selective viewing means each comprise a pair of color filters of substantially non-overlapping transmission characteristics, the corresponding filters of each pair being of a substantially similar transmission characteristic.

5. The apparatus of claim 1 wherein said radiation modifying means and said selective viewing means each comprise a pair of polarizing filters oriented in different polarizing directions, the corresponding polarizing filters of each pair being similarly oriented.

6. The apparatus of claim 1 wherein said screen is hingedly connected to the base portion of a box, said screen being foldable downward to close said box, said base portion having means thereon for mounting said sources of radiation and wherein a brace is provided for holding said screen at an angle to said base portion such that a space of triangular cross-section is defined between said screen and said base portion, said space being openly accessible to the observer for insertion and manipulation of objects therein between said sources and said screen.

7. The apparatus of claim 1 wherein the lateral separation between said sources of radiation is less than the interocular distance.

8. The apparatus of claim 1 wherein the lateral separation between said sources of radiation is substantially equal to the interocular distance, and the source to screen distance is substantially equal to the eye to screen distance.

9. A method of forming a three dimensional image comprising the steps of:
    projecting two differentially modified beams of radiation through a common space region onto a screen;
    interposing in said common space region a three-dimensional object having a plurality of optical elements each intercepting and transversely deviating ray elements in both of said beams to form on said screen a pair of position-modulated images, each of said plurality of optical elements having an identifiable, corresponding position-modulated element in each of said images;
    interposing a radiation modifying means between said images and the observer; and
    viewing said images through said radiation modifying means.

10. The method of claim 9 wherein said radiation modifying means are interposed on one side of said screen and said object is interposed on the other side of said screen.

11. The method of claim 9 wherein said radiation modifying means and said object are interposed on the same side of said screen.

12. The apparatus of claim 1 wherein said plurality of object elements include transparent regions of refractivity different from that of air and of varying geometric disposition in said object.

13. The apparatus of claim 1 wherein said plurality of object elements includes specularly reflective regions of varying angular disposition relative to the directions of the respective ray elements impinging thereon.

14. A desk-top apparatus for forming a three-dimensional image in space within the normal reading range of an observer comprising:
 first and second spaced sources of radiation, each providing a diverging beam emanating substantially from a point, said spacing not exceeding in excess of approximately one-third the interocular distance;
 means differentially modifying said beams while retaining their character of divergence from said points;
 a screen spaced from said sources and said differentially modifying means providing a common space within the reach of an observer;
 a three-dimensional object in said common space, said object including a plurality of optical elements each intercepting and transversely deviating ray elements from both of said sources whereby said object modulates each of said beams and forms on said screen a pair of position-modulated images, each of said plurality of optical elements having an identifiable, corresponding position-modulated element in each of said images; and
 selective viewing means for cooperation with the eyes of an observer whereby different ones of said images are made visible substantially exclusively to different ones of the eyes of an observer thereby to form an apparent three-dimensional object within the reading range of the observer between said screen and said observer.

15. The desk-top apparatus of claim 14 wherein said object is manually deformable.

References Cited by the Examiner
UNITED STATES PATENTS

| | | | |
|---|---|---|---|
| 1,503,766 | 8/1924 | Pictet et al. | 352—60 X |
| 1,729,617 | 10/1929 | Kelley et al. | 88—29 X |
| 2,362,235 | 11/1944 | Barnes | 35—19 |
| 2,396,251 | 3/1946 | Colley | 88—24 |
| 2,396,902 | 3/1946 | Tuttle | 88—1 |
| 2,665,335 | 1/1954 | Cohen | 352—57 X |
| 2,821,393 | 1/1958 | Hoppe | 272—10 |

FOREIGN PATENTS

| | | |
|---|---|---|
| 229,445 | 2/1952 | Great Britain. |
| 344,685 | 3/1931 | Great Britain. |
| 398,937 | 9/1933 | Great Britain. |

EUGENE R. CAPOZIO, *Primary Examiner.*

JEROME SCHNALL, *Examiner.*

H. S. SKOGQUIST, *Assistant Examiner.*

UNITED STATES PATENT OFFICE
CERTIFICATE OF CORRECTION

Patent No. 3,280,478                      October 25, 1966

Allen Strickler

It is hereby certified that error appears in the above numbered patent requiring correction and that the said Letters Patent should read as corrected below.

Column 7, line 34, for "filler" read -- filter --; line 73, for "osberver" read -- observer --; column 9, lines 71 to 73, the formula should appear as shown below instead of as in the patent:

$$f = 1 - \left(\frac{\cos i'}{\cos r'} \frac{\cos i}{\cos r}\right)$$

column 13, line 35, for "dots" read -- dot groups --.

Signed and sealed this 12th day of September 1967.

(SEAL)
Attest:

ERNEST W. SWIDER                     EDWARD J. BRENNER
Attesting Officer                  Commissioner of Patents